(12) United States Patent
Seregin et al.

(10) Patent No.: US 11,095,916 B2
(45) Date of Patent: Aug. 17, 2021

(54) WRAPAROUND MOTION COMPENSATION IN VIDEO CODING

(71) Applicant: QUALCOMM Incorporated, San Diego, CA (US)

(72) Inventors: Vadim Seregin, San Diego, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/934,483

(22) Filed: Jul. 21, 2020

(65) Prior Publication Data

US 2021/0029371 A1 Jan. 28, 2021

Related U.S. Application Data

(60) Provisional application No. 62/877,751, filed on Jul. 23, 2019.

(51) Int. Cl.
| | |
|---|---|
| *H04N 19/51* | (2014.01) |
| *H04N 19/44* | (2014.01) |
| *H04N 19/70* | (2014.01) |
| *H04N 19/176* | (2014.01) |

(52) U.S. Cl.
CPC .......... *H04N 19/51* (2014.11); *H04N 19/176* (2014.11); *H04N 19/44* (2014.11); *H04N 19/70* (2014.11)

(58) Field of Classification Search
CPC ................................. H04N 19/51; H04N 19/70
See application file for complete search history.

(56) References Cited

U.S. PATENT DOCUMENTS

| | | | |
|---|---|---|---|
| 2017/0085917 A1 | 3/2017 | Hannuksela | |
| 2018/0376126 A1* | 12/2018 | Hannuksela | ....... H04N 5/23238 |
| 2020/0213617 A1* | 7/2020 | Choi | ....... H04N 19/70 |
| 2020/0260070 A1* | 8/2020 | Yoo | ....... H04N 19/157 |

FOREIGN PATENT DOCUMENTS

| | | | | |
|---|---|---|---|---|
| WO | WO-2020069058 A1 * | 4/2020 | ........... | H04N 19/597 |
| WO | WO-2020090841 A1 * | 5/2020 | ........... | H04N 19/70 |
| WO | WO-2020185884 A1 * | 9/2020 | ........... | H04N 19/70 |

OTHER PUBLICATIONS

Bross B, et al., "Versatile Video Coding (Draft 4)", 125. MPEG Meeting, Jan. 14, 2019-Jan. 18, 2019; Marrakech; (Motion Picture Expert Group or ISO/IEC JTC1/SC29/WG11), No. m46627, Mar. 9, 2019 (Mar. 9, 2019), XP030215564, Retrieved from the Internet: URL:http://phenix.int-evry.fr/mpeg/doc_end_user/documents/125_Marrakech/wg11/m46627-JVET-M1001-v6-JVET-M1001-v6.zip JVET-M1001-v6.docx [retrieved on Mar. 9, 2019] (301 pp).

(Continued)

*Primary Examiner* — Mainul Hasan
(74) *Attorney, Agent, or Firm* — Shumaker & Sieffert, P.A.

(57) ABSTRACT

Parameters used to perform wraparound motion compensation are available in a common parameter set. A video encoder may signal and a video decoder may parse a syntax element in a picture parameter set (PPS) indicative of an offset used for wraparound motion compensation for a current block of the video data.

24 Claims, 5 Drawing Sheets

(56) References Cited

OTHER PUBLICATIONS

Bross B., et al., "Versatile Video Coding (Draft 5)", 14th JVET Meeting, Mar. 19, 2019-Mar. 27, 2019, Geneva, (The Joint Video Exploration Team of ISO/IEC JTC1/SC29/WG11 and ITU-T SG.16), No. JVET-N1001-v9, Jun. 25, 2019 (Jun. 25, 2019), XP030220730, 403 Pages, Retrieved from the Internet: URL:http://phenix.int-evry.fr/jvet/doc_end_user/documents/14_Geneva/wg11/Jvet-N1001-v9.zip, JVET-N1001-v9.docx [retrieved on Jun. 25, 2019].

Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vB, 15th Meeting: Gothenburg, SE, Jul. 3-12, 2019, 426 pages.

Bross et al., "Versatile Video Coding (Draft 9)", Joint Video Experts Team (JVET) of Itu-T SG 16 WP 3 and ISO/IEC JTC 1/SC 29/WG 11, 18th Meeting: by teleconference, Apr. 15-24, 2020, Document: JVET-R2001-v8, 528 Pages.

Chang Y-J (QUALCOMM)., et al., "AhG9: On the Wraparound Offsets", 17. JVET Meeting; Jan. 7, 2020-Jan. 17, 2017; Brussels; (The Joint Video Exploration Team of ISO/IEC JTC1/SC29/WG11 and ITU-T SG.16), No. JVET-Q0335, Jan. 1, 2020 (Jan. 1, 2020), XP030223210, 6 pages, Retrieved from the Internet: URL: http://phenix.int-evry.fr/jvet/doc_end_user/documents/17_Brussels/wg11/JVET-Q0335-v1.zip JVET-Q0335-v1/JVET-Q0335.docx [retrieved on Jan. 1, 2020].

Chen P., et al., "AHG8: Integrated Specification Text for Reference Picture Resampling", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O1164-v1, pp. 1-2.

Heng (BROADCOM) B., et al., "AHG16/AHG8: Proposed Cleanup for Reference Wraparound," 14. JVET Meeting, Mar. 19, 2019-Mar. 27, 2019; Geneva; (The Joint Video Exploration Team of ISO/IEC JTC1/SC29/WG11 and ITU-T SG.16), No. JVET-N0070, Mar. 26, 2019 (Mar. 26, 2019), XP030256811, 8 pages, Retrieved from the Internet: URL:http://phenix.int-evry.fr/jvet/doc_end_user/documents/14_Geneva/wg11/JVET-N0070-v2.zip JVET-N0070-v2.docx [retrieved-on Mar. 26, 2019].

International Search Report and Written Opinion—PCT/US2020/043008—ISA/EPO—dated Oct. 6, 2020 (18 pp).

Pham Van (QUALCOMM) L., et al., "Non-CE3: Signalling Unification of Prediction Mode and SCIPU Mode," 128. MPEG Meeting; Oct. 7, 2019-Oct. 11, 20119; Geneva; (Motion Picture Expert Group or ISO/IEC JTC1/SC29/WG11), No. m50454, Sep. 25, 2019 (Sep. 25, 2019), XP030206557, Retrieved from the Internet: URL: http://phenix.int-evry.fr/mpeg/doc_end_user/documents/128_Geneva/wg11/m50454-JVET-P0484-v1-JVET-P0484.zipJVET-O2001-P0484.docx [retrieved on Sep. 25, 2019] (3 pp).

\* cited by examiner

WRAPAROUND MOTION COMPENSATION IN VIDEO CODING

This application claims the benefit of U.S. Provisional Application No. 62/877,751, filed Jul. 23, 2019, the entire contents of which are hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for wraparound motion compensation. This disclosure describes example techniques for better ensuring that parameters used to perform wraparound motion compensation are available in a common parameter set such that video processing resources are not wasted accessing information from a different parameter set. The techniques of this disclosure may also reduce delay in video processing due to waiting on data from different parameter sets. This disclosure also describes example techniques related to chroma formatting.

In one example, the disclosure describes a method of decoding video data, the method comprising parsing a syntax element in a picture parameter set (PPS) indicative of an offset used for wraparound motion compensation for a current block of the video data and inter-prediction decoding the current block based on the offset used for wraparound motion compensation.

In one example, the disclosure describes a device for decoding video data, the device comprising memory configured to store syntax elements of a picture parameter set (PPS) and processing circuitry configured to parse a syntax element in the PPS indicative of an offset used for wraparound motion compensation for a current block of the video data and inter-prediction decode the current block based on the offset used for wraparound motion compensation.

In one example, the disclosure describes a method of encoding video data, the method comprising inter-prediction encoding a current block of the video data based on an offset used for wraparound motion compensation and signaling a syntax element in a picture parameter set (PPS) indicative of the offset used for the wraparound motion compensation for the current block.

In one example, the disclosure describes a device for encoding video data, the device comprising memory configured to store syntax elements of a picture parameter set (PPS) and processing circuitry configured to inter-prediction encoding a current block of the video data based on an offset used for wraparound motion compensation and signal a syntax element in the PPS indicative of the offset used for the wraparound motion compensation for the current block.

In one example, the disclosure describes a device for decoding video data, the device comprising means for parsing a syntax element in a picture parameter set (PPS) indicative of an offset used for wraparound motion compensation for a current block of the video data and means for inter-prediction decoding the current block based on the offset used for wraparound motion compensation.

In one example, the disclosure describes a computer-readable storage medium having stored thereon instructions that, when executed, cause one or more processors to parse a syntax element in a picture parameter set (PPS) indicative of an offset used for wraparound motion compensation for a current block of the video data and inter-prediction decode the current block based on the offset used for wraparound motion compensation.

The details of one or more examples are set forth in the accompanying drawings and the description below. Other features, objects, and advantages will be apparent from the description, drawings, and claims.

DETAILED DESCRIPTION

Figure 1:
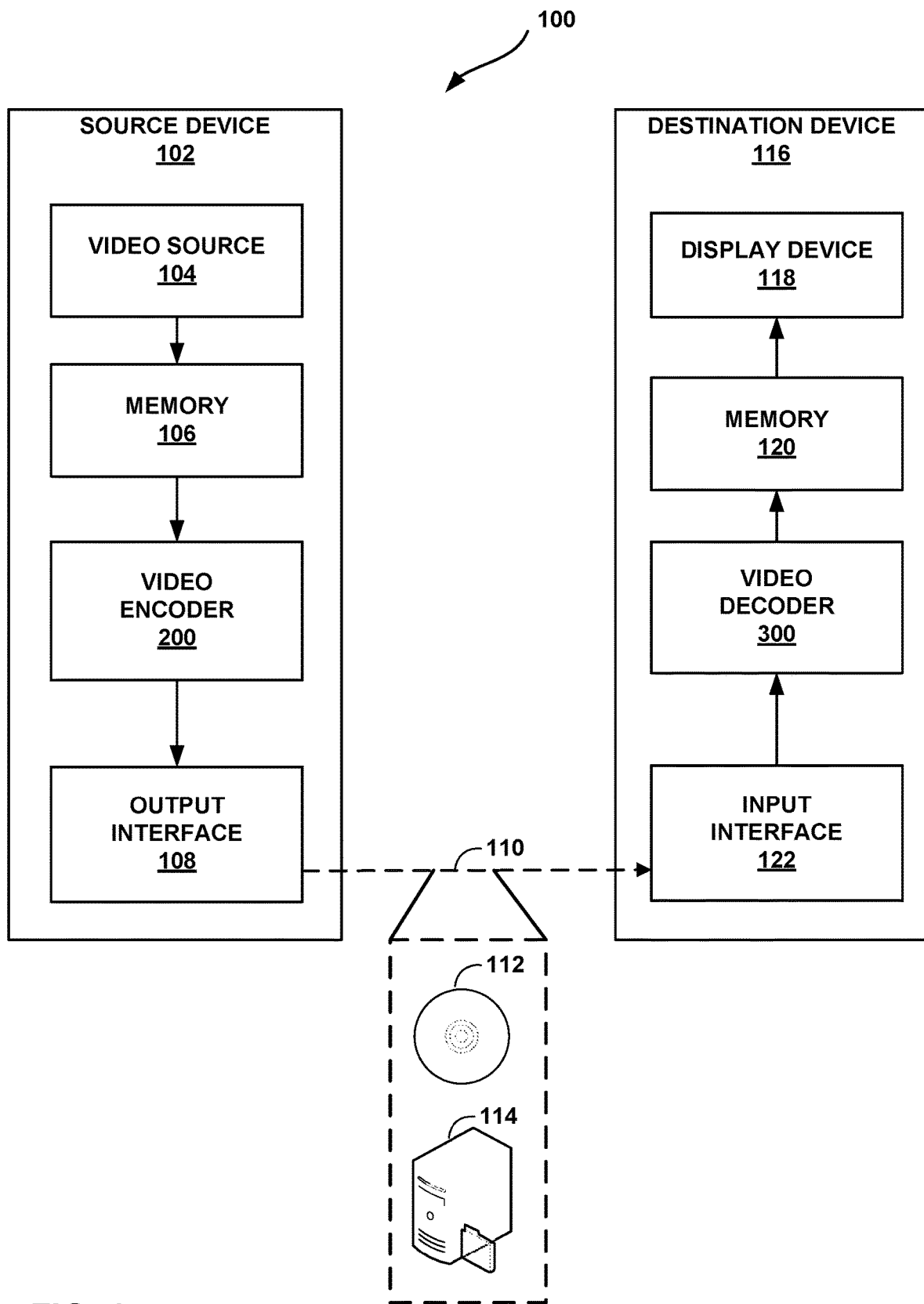
FIG. 1 is a block diagram illustrating an example video encoding and decoding system that may perform the techniques of this disclosure.

This disclosure describes example techniques related to wraparound motion compensation, and in some examples, wraparound motion compensation with reference picture resampling. This disclosure also describes techniques related to chroma formatting.

Wraparound motion compensation may be utilized in coding omni-directional video content (also referred to as 360° video content). Wraparound motion compensation utilizes video content wrapping around in 360° video content for purposes of inter-prediction. For example, a video coder (e.g., video encoder or video decoder) may generate a prediction block for inter-predicting a current block based on samples along opposite boundaries of a reference picture. For instance, the prediction block may include samples from a portion in the reference picture that extends beyond the left boundary of the reference picture and wraps back to the right boundary of the reference picture. In this example, the prediction block includes samples near the left boundary of the reference picture and samples from near the right boundary of the reference picture.

In reference picture resampling, the resolution of one or more reference pictures in a reference picture list may be different than the resolution of a current picture that includes a current block being inter-predicted. In some examples, in reference picture resampling, a wraparound motion compensation process may be used. However, wraparound motion compensation process may be performed even if reference picture resampling is not performed.

For wraparound motion compensation, a syntax element indicating whether the wraparound motion compensation process is enabled is signaled in a particular parameter set. However, some existing techniques utilize parameter values from one parameter set to determine whether the syntax element indicating whether the wraparound motion compensation process is enabled is signaled in a different parameter set. That is, in these existing techniques, to parse one parameter set to determine if wraparound motion compensation process is enabled requires accessing another parameter set. Moreover, a syntax element indicative of an offset used for wraparound motion compensation may be signaled in the same parameter set as the syntax element indicating whether the wraparound motion compensation process is enabled.

In those techniques, there may be certain issues. For instance, a video coder (e.g., video decoder) may need to access multiple different parameter sets to determine the value of the syntax element indicating whether the wraparound motion compensation process is enabled or not. Accessing different parameter sets may impact processing time because the parameter sets may be stored in different locations and potentially off-chip. As another example, from the perspective of the video decoder, the video decoder may need to wait until multiple parameters sets are received before the video decoder can being to determine whether the wraparound motion compensation process is enabled.

This disclosure describes example techniques to better ensure that the parameters used for determining whether the wraparound motion compensation process is enabled are available in a common parameter set, if needed at all. In this way, the example techniques provide a practical application to video coding that may improve computational efficiency and operation of the video coder.

This disclosure also describes example techniques applicable to chroma formatting. For example, this disclosure describes examples of syntax elements used to derive a conformance window being signaled in examples of a parameter set.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for wraparound motion compensation with reference picture resampling and syntax elements for deriving conformance window. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for wraparound motion compensation with reference picture resampling and syntax elements for deriving conformance window. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vB (hereinafter "VVC Draft 6"). A more recent draft of the VVC standard is described in Bross, et al. "Versatile Video Coding (Draft 9)," Joint Video Experts Team (JVET) of ITU-T SG 16 WP 3 and ISO/IEC JTC 1/SC 29/WG 11, 18$^{th}$ Meeting: by teleconference, 15-24 Apr. 2020, JVET-R2001-v8 (hereinafter "VVC Draft 9"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

In some examples, VVC may provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. In some examples, VVC may provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As is described in more detail below, video encoder 200 and video decoder 300 may be configured to perform wraparound motion compensation, and in some examples, wraparound motion compensation with reference picture resampling and determining of syntax elements for deriving a conformance window, in accordance with the techniques of this disclosure. As one example, video encoder 200 may signal and video decoder 300 may parse syntax elements used for wraparound motion compensation, such as part of omni-directional or 360° video content. In wraparound motion compensation, video encoder 200 and video decoder 300 may generate a prediction block from a reference picture where the prediction block includes samples from opposite boundaries of the reference picture.

For example, in wraparound motion compensation, a motion vector for a current block may identify a region in the reference picture that extends outside the boundary of the reference picture. As an example, the motion vector may refer to a region that extends beyond the left boundary of the reference picture. In examples where wraparound motion compensation is used, the prediction block may include samples from the region of the reference picture up to the left boundary and then wrap around to include samples from the right boundary of the reference picture. Wraparound motion compensation may also be referred to as horizontal wraparound motion compensation.

In accordance with one or more examples described in this disclosure, one or more syntax elements used for wraparound motion compensation may be included in the same parameter set, such as a picture parameter set. Moreover, the signaling by video encoder 200 or parsing by video decoder 300 of one or more syntax elements used for wraparound motion compensation, which are not in the picture parameter set, may not be contingent upon any information available in the picture parameter set. For example, there may be a syntax element in the sequence parameter set that is used for the wraparound motion compensation. However, whether this syntax element is to be signaled or parsed in the sequence parameter set may not depend on any information in the picture parameter set. In this way, video decoder 300 may be able to parse syntax elements of a parameter set without needing to parse syntax elements of another parameter set, which promotes efficient video coding (e.g., video decoder 300 does not need to wait for all parameter sets before starting the parsing, and when parsing a parameter set, video decoder 300 does not need additional memory accesses to another parameter set).

A video coder (e.g., video encoder 200 or video decoder 300) may be configured to code (e.g., video encoder 200 may signal and video decoder 300 may parse) information used to determine whether wraparound motion compensation is applied in a parameter set (e.g., pic_width_luma_samples in the PPS or max_width_in_luma_samples in the SPS) and code a syntax element indicating whether wraparound motion compensation is applied in the same parameter set (e.g., ref_wraparound_enabled_flag in PPS where pic_width_luma_samples is used or ref_wraparound_enabled_flag in SPS where max_width_in_luma_samples is used). When ref_wraparound_enabled_flag is part of the PPS, ref_wraparound_enabled may be referred to as pps_ref_wraparound_enabled_flag. When ref_wraparound_enabled_flag is part of the SPS, ref_wraparound_enabled may be referred to as sps_ref_wraparound_enabled_flag.

In some examples, the video coder may be configured to code (e.g., video encoder 200 may signal and video decoder 300 may parse) a syntax element indicating whether wraparound motion compensation is applied regardless of a picture width in luma samples (e.g., regardless of the picture width). For example, whether sps_ref_wraparound_enabled_flag or pps_ref_wraparound_enabled_flag is signaled or not is not based on the value of pic_width_luma_samples.

In some examples, the video coder may be configured to code information used to derive conformance window using any technique or combination of techniques described in the disclosure. For instance, this disclosure describes examples with respect to the chroma_format_idc and separate_colour_plane_flag syntax elements.

In Chen, et al. "AHG8: Integrated Specification Text for Reference Picture Resampling," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O1164 (hereinafter "JVET-O1164"), reference picture resampling (RPR) was proposed. In the proposal, a current picture and reference pictures may have different resolutions. As such, during motion compensation, differences in resolution are considered during the interpolation filtering by adjusting the interpolation filter phase.

The sps_ref_wraparound_enabled_flag indicates that there is wraparound motion compensation.

```
if( ( CtbSizeY / MinCbSizeY + 1) <=
  ( pic_width_in_luma_samples / MinCbSizeY – 1 ) ) {
    sps_ref_wraparound_enabled_flag                u(1)
    if( sps_ref_wraparound_enabled_flag )
      sps_ref_wraparound_offset_minus1             ue(v)
}
```

In the above, CtbSizeY is a height of the coding tree block (largest coding block size), MinCbSizeY is indicative of minimum coding block size, and pic_width_in_luma_samples is indicative of the picture width of a picture (e.g., in luma samples).

In some examples, sps_ref_wraparound_enabled_flag equal to 1 specifies that horizontal wrap-around motion compensation is applied in inter prediction, and sps_ref_wraparound_enabled_flag equal to 0 specifies that horizontal wrap-around motion compensation is not applied. When not present, the value of sps_ref_wraparound_enabled_flag is inferred to be equal to 0.

In some examples, sps_ref_wraparound_offset_minus1 plus 1 specifies the offset used for computing the horizontal wrap-around position in units of MinCbSizeY luma samples. The value of ref_wraparound_offset_minus1 may be in the range of (CtbSizeY/MinCbSizeY)+1 to (pic_width_in_luma_samples/MinCbSizeY)−1, inclusive.

In JVET-O1164, picture size signaling is moved from the SPS to the PPS, but sps_ref_wraparound_enabled_flag still depends on the picture size indicated by pic_width_in_luma_samples, which is no longer present in SPS. For example, in the above syntax, whether sps_ref_wraparound_enabled_flag is signaled in the SPS, and similarly, whether sps_ref_wraparound_offset_minus1 is signaled in the SPS, depends on the value of pic_width_in_luma_samples. However, the syntax element pic_width_in_luma_samples may be present in the PPS, and not the SPS. Therefore, video decoder 300 may need to parse the PPS to determine the value of pic_width_in_luma_samples to determine whether or not to parse sps_ref_wraparound_enabled_flag and sps_ref_wraparound_offset_minus1.

Therefore, there may be technical problem where determining whether wraparound motion compensation is enabled is based on information in different parameter sets (e.g., pic_width_in_luma_samples is available in the PPS but sps_ref_wraparound_enabled_flag is in the SPS). As described above, needing different parameter sets may result in delay in decoding as well as processing overhead from memory access.

This disclosure describes example solutions to the issues. The example techniques may be used separately or in any combination.

In the SPS, video encoder 200 may be configured to signal and video decoder 300 may be configured to receive the max picture size as:

| | |
|---|---|
| max_width_in_luma_samples | ue(v) |
| max_height_in_luma_samples | ue(v) |

In one example, video encoder 200 may be configured to signal and video decoder 300 may be configured to receive sps_ref_wraparound_enabled_flag depending on max_width_in_luma_samples instead of pic_width_in_luma_samples.

An example of the implementation is provided below.

```
if( ( CtbSizeY / MinCbSizeY + 1) <=
  ( max_width_in_luma_samples / MinCbSizeY – 1 ) ) {
    sps_ref_wraparound_enabled_flag                u(1)
    if( sps_ref_wraparound_enabled_flag )
      sps_ref_wraparound_offset_minus1             ue(v)
}
```

In one example, video encoder 200 may signal and video decoder 300 may parse the syntax elements sps_ref_wraparound_enabled_flag and sps_ref_wraparound_offset_minus1 in the PPS. In such examples, the signaling conditions (e.g., if ((CtbSizeY/MinCbSizeY+1)<=(max_width_in_luma_samples/MinCbSizeY−1))) can be kept unchanged, since pic_width_in_luma_samples is signaled in PPS. However, requiring that the condition (e.g., if ((CtbSizeY/MinCbSizeY+1)<=(max_width_in_luma_samples/MinCbSizeY−1))) be checked may not be necessary in all examples. In accordance with one or more examples described in this, rather than using the syntax elements sps_ref_wraparound_enabled_flag and sps_ref_wraparound_offset_minus1, the syntax elements may be referred to as pps_ref_wraparound_enabled_flag and pps_ref_wraparound_offset_minus1.

In some examples, the PPS may include pps_ref_wraparound_enabled_flag and pps_ref_wraparound_offset_minus1. In such examples, it may be possible for the SPS to still include the sps_ref_wraparound_enabled_flag to provide SPS level signaling for indicating whether wraparound compensation is enabled or not.

Additionally, video encoder 200 may signal and video decoder 300 may parse the CTB size (CtbSizeY) and min CB size (MinCbSizeY) from the PPS, since CtbSizeY and MinCbSizeY are used in sps_ref_wraparound_enabled_flag signaling. Instead of signaling or receiving from SPS, those syntax elements can be additionally signaled in PPS, where the semantics of PPS syntax elements are constrained such that CtbSizeY and MinCbSizeY signaled in the PPS shall be the same or equal to syntax elements (e.g., CtbSizeY and MinCbSizeY) signaled in SPS. In other words, one or more or all of ref_wraparound_enabled_flag, ref_wraparound_offset_minus1, CtbSizeY, and MinCbSizeY may be signaled in both the SPS and PPS as copies of one another but may not be required to be copies of one another.

For instance, as described above, it may be possible for the PPS to include ref_wraparound_enabled_flag (e.g., pps_ref_wraparound_enabled_flag) and for the SPS into include ref_wraparound_enabled_flag (e.g., sps_ref_wraparound_enabled_flag). In some examples, pps_ref_wraparound_enabled_flag and sps_ref_wraparound_enabled_flag may be copies of one another. However, in some examples, it may be possible for pps_ref_wraparound_enabled_flag and sps_ref_wraparound_enabled_flag to be different. For example, at a sequence level, wraparound motion compensation may be enabled (e.g., sps_ref_wraparound_enabled_flag may be true), but at a picture level for a particular picture, wraparound motion compensation may be disabled (e.g., pps_ref_wraparound_enabled_flag may be false).

As described above, some techniques required signaling of sps_ref_wraparound_enabled_flag to be contingent on the following condition being satisfied: "if ((CtbSizeY/MinCbSizeY+1)<=(pic_width_in_luma_samples/MinCbSizeY−1))." As also described above, there were technical problems with such a condition because pic_width_in_luma_samples was not available in the SPS.

In some examples, as also described above, the SPS may include the sps_ref_wraparound_enabled_flag. To ensure that access to the PPS is not required to parse sps_ref_wraparound_enabled_flag from the SPS, the condition "if ((CtbSizeY/MinCbSizeY+1)<=(pic_width_in_luma_samples/MinCbSizeY−1))" may be removed from sps_ref_wraparound_enabled_flag signaling. For instance, video encoder 200 and video decoder 300 may code a syntax element indicating whether wraparound motion compensation is applied (e.g., ref_wraparound_enabled_flag) regardless of a picture width, such as in luma samples (e.g., regardless of pic_width_in_luma_samples).

In one or more examples, the semantics of sps_ref_wraparound_enabled_flag can be constrained such that sps_ref_wraparound_enabled_flag shall be equal to 0 if (CtbSizeY/MinCbSizeY+1)>(pic_width_in_luma_samples/MinCbSizeY−1). This may be considered as the inverse condition of the sps_ref_wraparound_enabled_flag signaling. Stated another way, if sps_ref_wraparound_enabled_flag indicates that wraparound compensation is enabled (e.g., sps_ref_wraparound_enabled_flag is 1), then (CtbSizeY/MinCbSizeY+1) is less than or equal to (pic_width_in_luma_samples/MinCbSizeY−1). In this way, if sps_ref_wraparound_enabled_flag is 1, then for the bitstream to be conforming, (CtbSizeY/MinCbSizeY+1) is less than or equal to (pic_width_in_luma_samples/MinCbSizeY−1).

Additionally or alternatively, video encoder 200 may signal and video decoder 300 may parse chroma format IDC chroma_format_idc and separate_colour_plane_flag from the PPS in addition to or instead of the SPS.

Alternative to signaling or parsing from SPS, chroma_format_idc and optionally separate_colour_plane_flag can be additionally signaled in PPS, where the semantics of the chroma_format_idc and separate_colour_plane_flag in PPS are constrained such as they shall be the same or equal to the chroma_format_idc and separate_colour_plane_flag signaled in SPS, respectively.

| | |
|---|---|
| chroma_format_idc | ue(v) |
| if( chroma_format_idc = = 3 ) | |
|    separate_colour_plane_flag | u(1) |

In some examples, chroma_format_idc specifies the chroma sampling relative to the luma sampling as specified in clause 6.2 of VVC draft 6. The value of chroma_format_idc may be in the range of 0 to 3, inclusive. In some examples, separate_colour_plane_flag equal to 1 specifies that the three colour components of the 4:4:4 chroma format are coded separately, and separate_colour_plane_flag equal to 0 specifies that the colour components are not coded separately. When separate_colour_plane_flag is not present, it is inferred to be equal to 0. When separate_colour_plane_flag is equal to 1, the coded picture consists of three separate components, each of which consists of coded samples of one colour plane (Y, Cb, or Cr) and uses the monochrome coding syntax. In this case, each colour plane is associated with a specific colour_plane_id value.

In one or more examples, chroma_format_idc is used to derive conformance window, which is moved to PPS in JVET-O01164. Chroma format IDC is used to derive a scaling factor (SubWidthC in VVC specification) for conformance window. In some cases, keeping the chroma format IDC in SPS creates a dependency in conformance window derivation. The derivation in this case can be done only at slice level when PPS and SPS used in the slice are known. If chroma_format_idc is signaled to PPS or additionally signaled in PPS, a conformance window can be derived at PPS parsing, which may be preferred in case of having multiple PPS and SPS in a bitstream.

In accordance with one or more examples described in this disclosure, video decoder 300 may parse a syntax element in a picture parameter set (PPS) indicative of an offset used for wraparound motion compensation for a current block of the video data. For instance, video decoder 300 may parse pps_ref_wraparound_offset_minus1. It should be noted that pps_ref_wraparound_offset_minus1 is one example of a syntax element indicative of an offset used for wraparound motion compensation. However, there may be various examples of syntax elements in the PPS that are indicative of an offset used for wraparound motion compensation for a current block. As one example, a syntax element that indicates a difference between the picture width and offset may be a syntax element in the PPS indicative of an offset used for wraparound motion compensation for a current block. As another example, a syntax element that indicates the actual value of the offset may be signaled in the PPS. There may be various ways in which information indicative of the offset may be included in the PPS, and this disclosure should not be considered limited to pps_ref_wraparound_offset_minus1.

The syntax element in the PPS indicative of an offset used for wraparound motion compensation for a current block of the video data may be considered as a first syntax element. In some examples, video decoder 300 may parse a second syntax element in the PPS indicative of whether wraparound motion compensation is enabled. One example of the second syntax element is pps_ref_wraparound_enabled_flag. For example, to parse the syntax element in the PPS indicative of the offset used for wraparound motion compensation for the current block, video decoder 300 may parse the first syntax element based on the second syntax element in the PPS indicating that wraparound motion compensation is enabled. That is, video decoder 300 may parse pps_ref_wraparound_enabled_flag, and based on pps_ref- _wraparound_enabled_flag being true, video decoder 300 may parse the syntax element in the PPS indicative of the offset used for wraparound motion compensation for the current block.

In one or more examples, the SPS may also include a syntax element indicating whether wraparound compensation is enabled. For example, the SPS may include sps_ref_wraparound_enabled_flag (e.g., video encoder 200 may encode in the SPS sps_ref_wraparound_enabled_flag). In one or more examples, video decoder 300 may parse a second syntax element in a sequence parameter set (SPS) indicative of whether wraparound motion compensation is enabled (e.g., parse sps_ref_wraparound_enabled_flag) regardless of a picture width. The value of the second syntax element (e.g., sps_ref_wraparound_enabled_flag), indicating that wraparound motion compensation is enabled, may be constrained based on the picture width, minimum block size, and maximum block size.

For example, video decoder 300 may not need to determine if the following condition is true or not, (CtbSizeY/MinCbSizeY+1) is less than or equal to (pic_width_in_luma_samples/MinCbSizeY−1). Rather, based on the second syntax element (e.g., sps_ref_wraparound_enabled_flag) indicating that wraparound motion compensation is enabled, (CtbSizeY/MinCbSizeY+1) may necessarily be less than or equal to (pic_width_in_luma_samples/MinCbSizeY−1). As described above, CtbSizeY is a height of the coding tree block (largest coding block size), MinCbSizeY is indicative of minimum coding block size, and pic_width_in_luma_samples is indicative of the picture width of a picture that includes the current block.

Video decoder 300 may be configured to inter-predict decode the current block based on the offset used for wraparound motion compensation. For example, video decoder 300 may generate a prediction block based on the offset used for wraparound motion compensation and add the prediction block to a residual block to reconstruct the current block. Wraparound offset specifies the offset from a picture boundary where the part of prediction block extending outside of the picture is moved when wraparound happens. For example, the wraparound offset may specify by how much a prediction block that extends over one boundary (e.g., left boundary) wraps around over the other boundary (e.g., right boundary). As one example, the wraparound offset may be considered as a vertical line near the left boundary and a vertical line near the right boundary of a picture. The vertical lines may define by how much to wraparound to identify samples where a motion vector points to portions of a prediction block that extends over a boundary.

Video encoder 200 may perform similar operations as video decoder 300 but for encoding. For example, video encoder 200 may inter-prediction encode a current block of the video data based on an offset used for wraparound motion compensation. Video encoder 200 may generate a prediction block based on the offset used for wraparound motion compensation and signal information of a residual block indicative of a difference between the prediction block and the current block.

In one or more examples, video encoder 200 may signal a syntax element in a picture parameter set (PPS) indicative of the offset used for the wraparound motion compensation for the current block. One example of the syntax element is pps_ref_wraparound_offset_minus1. However, there may be various examples of syntax elements in the PPS that are indicative of an offset used for wraparound motion compensation for a current block. As one example, a syntax element that indicates a difference between the picture width and offset may be a syntax element in the PPS indicative of an offset used for wraparound motion compensation for a current block. As another example, a syntax element that indicates the actual value of the offset may be signaled in the PPS. There may be various ways in which information indicative of the offset may be included in the PPS, and this disclosure should not be considered limited to pps_ref_wraparound_offset_minus1.

The syntax element in the PPS indicative of an offset used for wraparound motion compensation for a current block of the video data may be considered as a first syntax element. Video encoder 200 may be configured to signal a second syntax element in the PPS indicative of whether wraparound motion compensation is enabled. One example of the second syntax element is pps_ref_wraparound_enabled_flag. In such examples, to signal the syntax element in the PPS indicative of the offset used for wraparound motion compensation for the current block, video encoder 200 may signal the first syntax element based on the second syntax element in the PPS indicating that wraparound motion compensation is enabled. That is, video encoder 200 may signal pps_ref_wraparound_enabled_flag, and based on pps_ref_wraparound_enabled_flag being true, video encoder 200 may signal the syntax element in the PPS indicative of the offset used for wraparound motion compensation for the current block.

In one or more examples, the SPS may also include a syntax element indicating whether wraparound compensation is enabled. For example, the SPS may include sps_ref_wraparound_enabled_flag. In one or more examples, video encoder 200 may signal a second syntax element in a sequence parameter set (SPS) indicative of whether wraparound motion compensation is enabled (e.g., signal sps_ref_wraparound_enabled_flag) regardless of a picture width. The value of the second syntax element (e.g., sps_ref_wraparound_enabled_flag), indicating that wraparound motion compensation is enabled, may be constrained based on the picture width, minimum block size, and maximum block size.

For example, video encoder 200 may not need to determine if the following condition is true or not, (CtbSizeY/MinCbSizeY+1) is less than or equal to (pic_width_in_luma_samples/MinCbSizeY−1). Rather, based on the second syntax element (e.g., sps_ref_wraparound_enabled_flag) indicating that wraparound motion compensation is enabled, (CtbSizeY/MinCbSizeY+1) may necessarily be less than or equal to (pic_width_in_luma_samples/MinCbSizeY−1). As described above, CtbSizeY is a height of the coding tree block (largest coding block size), MinCbSizeY is indicative of minimum coding block size, and pic_width_in_luma_samples is indicative of the picture width of a picture that includes the current block.

Figure 2A:
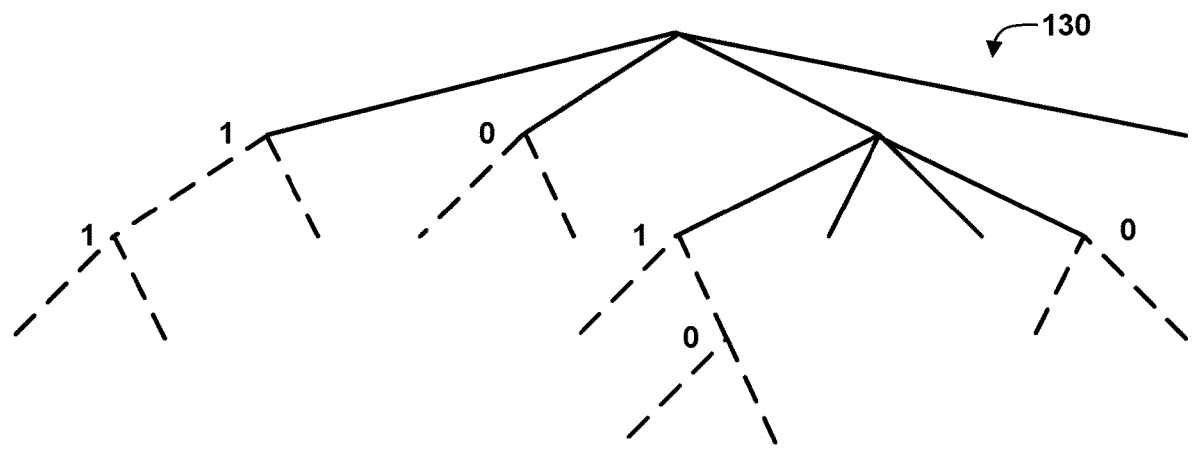
FIGS. 2A and 2B are conceptual diagrams illustrating an example quadtree binary tree (QTBT) structure, and a corresponding coding tree unit (CTU).
Figure 2B:
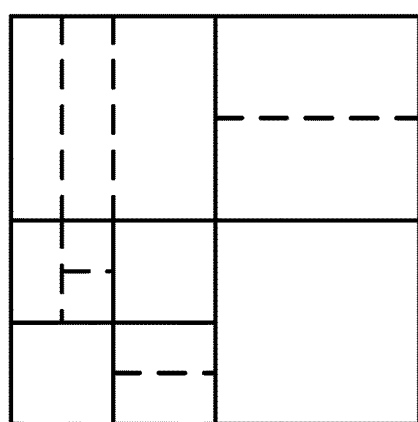

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
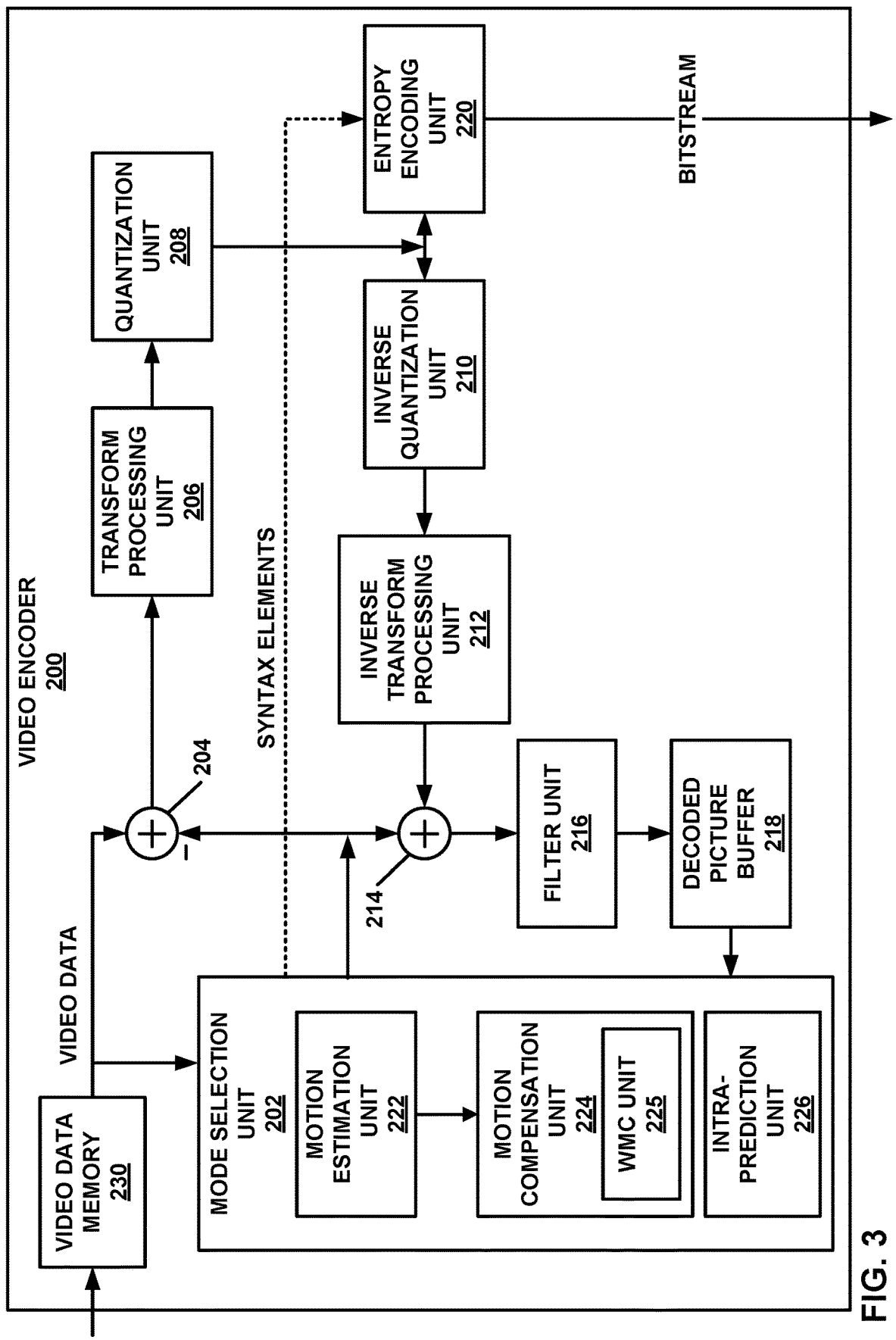
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As illustrated in FIG. 3, in some examples, motion compensation unit 224 includes wraparound motion compensation (WMC) unit 225. WMC unit 225 may be configured to perform one or more example techniques described in this disclosure. WMC unit 225 may be a logical unit within motion compensation unit 224 or may be its own separate circuitry within motion compensation unit 224.

As one example, mode selection unit 202 may determine whether wraparound motion compensation is enabled or not. Based on wraparound motion compensation being enabled, mode selection unit 202 may determine an offset used for wraparound motion compensation. WMC unit 225 may generated a prediction block for the current block using the offset used for wraparound motion compensation. As described below, using the prediction block generated using wraparound motion compensation, residual generation unit 204 may generate a residual block and entropy encoding unit 220 may signal information indicative of the residual block.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

As described above, WMC unit 225 may be configured to generate a prediction block and residual generation unit 204 may generate a residual block indicative of a difference between the prediction block and the current block. Entropy encoding unit 220 may signal information of the residual block indicative of a difference between the prediction block and the current block.

In one or more examples, mode selection unit 202 may cause entropy encoding unit 220 to signal a syntax element in a picture parameter set (PPS) indicative of the offset used for the wraparound motion compensation for the current block. As one example, mode selection unit 202 may cause entropy encoding unit 220 to signal pps_ref_wraparound_offset_minus1. As described above, pps_ref_wraparound_offset_minus1 is one example way in which to signal, in the PPS, information indicative of the offset used for wraparound motion compensation for the current block. However, there may be various other ways in which to signal information indicative of the offset. For instance, mode selection unit 202 may cause entropy encoding unit 220 to signal the actual offset value or signal information indicative of a difference between the picture width and the offset.

Also, the syntax element, in the PPS, indicative of the offset used for the wraparound motion compensation for the current block may be considered as a first syntax element. Mode selection unit 202 may cause entropy encoding unit 220 to signal a second syntax element in the PPS indicative of whether wraparound motion compensation is enabled (e.g., signal pps_ref_wraparound_enabled_flag). For example, to signal the syntax element in the PPS indicative of the offset used for wraparound motion compensation for the current block, mode selection unit 202 may cause entropy encoding unit 220 to signal the first syntax element (e.g., pps_ref_wraparound_offset_minus1 but not limited to pps_ref_wraparound_offset_minus1) based on the second syntax element (e.g., pps_ref_wraparound_enabled_flag but not limited to pps_ref_wraparound_enabled_flag) in the PPS indicating that wraparound motion compensation is enabled.

Moreover, mode selection unit 202 may cause entropy encoding unit 220 to signal a syntax element in a sequence parameter set (SPS) indicative of whether wraparound motion compensation is enabled (e.g., sps_ref_wraparound_enabled_flag). Mode selection unit 202 may cause entropy encoding unit 220 to signal this syntax element in the SPS regardless of picture width. For example, mode selection unit 202 may not first determine whether a particular condition based on picture width is satisfied before signaling the syntax element in the SPS indicative of whether wraparound motion compensation is enabled. For instance, mode selection unit 202 may not first determine if ((CtbSizeY/MinCbSizeY+1)<=(max_width_in_luma_samples/MinCbSizeY−1)) before determining whether to signal sps_ref_wraparound_enabled_flag.

However, there may be constraint of sps_ref_wraparound_enabled_flag. As one example, if sps_ref_wraparound_enabled_flag indicates that wraparound motion compensation is enabled, then ((CtbSizeY/MinCbSizeY+1)<=max_width_in_luma_samples/MinCbSizeY−1)) should be true. That is, sps_ref_wraparound_enabled_flag may be present in the bitstream regardless of picture width. However, if sps_ref_wraparound_enabled_flag is true, then ((CtbSizeY/MinCbSizeY+1)<=(max_width_in_luma_samples/MinCbSizeY−1)) should be true. If ((CtbSizeY/MinCbSizeY+1)<=(max_width_in_luma_samples/MinCbSizeY−1)) is false, then sps_ref_wraparound_enabled_flag is false (e.g., wraparound motion compensation is not enabled). Stated another way, based on the sps_ref_wraparound_enabled_flag indicating that wraparound motion compensation is enabled, (CtbSizeY/MinCbSizeY+1) is less than or equal to (pic_width_in_luma_samples/MinCbSizeY−1), where CtbSizeY is a height of the coding tree block (largest coding block size), MinCbSizeY is indicative of minimum coding block size, and pic_width_in_luma_samples is indicative of the picture width a picture that includes the current block. Accordingly, in one or more examples, the value of sps_ref_wraparound_enabled_flag, indicating that wraparound motion compensation is enabled, may be constrained based on the picture width, minimum block size, and maximum block size.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to code (e.g., encode) information (e.g., pic_width_in_luma_samples in PPS or max_width_in_luma_samples in SPS) used to determine whether a syntax element indicating whether wraparound motion compensation is enabled is present in a parameter set and code (e.g., encode) a syntax element indicating whether wraparound motion compensation is enabled in the same parameter set (e.g., pps_ref_wraparound_enabled_flag if pic_width_in_luma_samples in PPS is used or sps_ref_wraparound_enabled_flag if max_width_in_luma_samples is SPS is used). Video encoder 200 may be further configured to in a bitstream the encoded information used to determine whether the syntax element indicating whether wraparound motion compensation is enabled is present in the parameter set and signal in the bitstream the encoded syntax element indicating whether wraparound motion compensation is enabled in the same parameter set.

Figure 4:
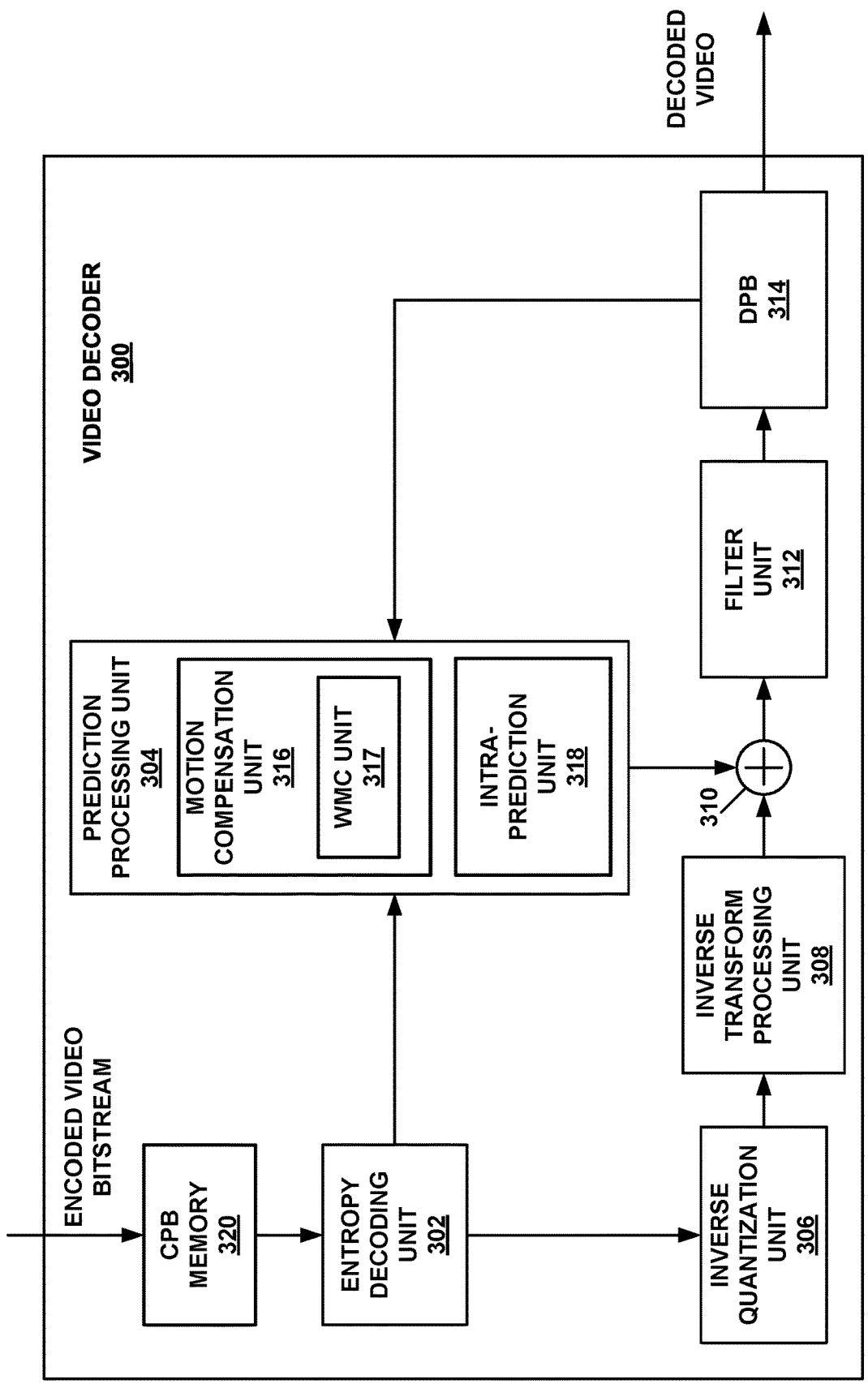
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As illustrated in FIG. 4, in some examples, motion compensation unit 316 includes wraparound motion compensation (WMC) unit 317. WMC unit 317 may be configured to perform one or more example techniques described in this disclosure. WMC unit 317 may be a logical unit within motion compensation unit 316 or may be its own separate circuitry within motion compensation unit 316.

As one example, prediction processing unit 304 may determine whether wraparound motion compensation is enabled or not. Based on wraparound motion compensation being enabled, prediction processing unit 304 may determine an offset used for wraparound motion compensation. WMC unit 317 may generated a prediction block for the current block using the offset used for wraparound motion compensation. As described below, using the prediction block generated using wraparound motion compensation, reconstruction unit 310 may add the prediction block to a residual block to reconstruct the current block.

As described above, prediction processing unit 304 may determine an offset used for wraparound motion compensation. In one or more examples, prediction processing unit 304 may parse a syntax element in a picture parameter set (PPS) indicative of the offset used for the wraparound motion compensation for the current block. As one example, prediction processing unit 304 may parse pps_ref_wraparound_offset_minus1 from the PPS. As described above, pps_ref_wraparound_offset_minus1 is one example way in which to determine, in the PPS, information indicative of the offset used for wraparound motion compensation for the current block. However, there may be various other ways in which to determine information indicative of the offset. For instance, prediction processing unit 304 may parse the actual offset value or may parse information indicative of a difference between the picture width and the offset.

Also, the syntax element, in the PPS, indicative of the offset used for the wraparound motion compensation for the current block may be considered as a first syntax element. Prediction processing unit 304 may parse a second syntax element in the PPS indicative of whether wraparound motion compensation is enabled (e.g., parse pps_ref_wraparound_enabled_flag). For example, to parse the syntax element in the PPS indicative of the offset used for wraparound motion compensation for the current block, prediction processing unit 304 may parse the first syntax element (e.g., pps_ref_wraparound_offset_minus1 but not limited to pps_ref_wraparound_offset_minus1) based on the second syntax element (e.g., pps_ref_wraparound_enabled_flag but not limited to pps_ref_wraparound_enabled_flag) in the PPS indicating that wraparound motion compensation is enabled. That is, prediction processing unit 304 may first parse pps_ref_wraparound_enabled_flag, and based on pps_ref_wraparound_enabled_flag being true, prediction processing unit 304 may parse a syntax element in the PPS indicative of the offset used for wraparound motion compensation (e.g., pps_ref_wraparound_offset_minus1 but not limited to pps_ref_wraparound_offset_minus1).

Moreover, prediction processing unit 304 may parse a syntax element in a sequence parameter set (SPS) indicative of whether wraparound motion compensation is enabled (e.g., sps_ref_wraparound_enabled_flag). Prediction processing unit 304 may parse this syntax element in the SPS regardless of picture width. For example, prediction processing unit 304 may not first determine whether a particular condition based on picture width is satisfied before parsing the syntax element in the SPS indicative of whether wraparound motion compensation is enabled. For instance, prediction processing unit 304 may not first determine if ((CtbSizeY/MinCbSizeY+1)<=(max_width_in_luma_samples/MinCbSizeY−1)) before determining whether to parse sps_ref_wraparound_enabled_flag.

However, there may be constraint of sps_ref_wraparound_enabled_flag. As one example, if sps_ref_wraparound_enabled_flag indicates that wraparound motion compensation is enabled, then ((CtbSizeY/MinCbSizeY+1)<=max_width_in_luma_samples/MinCbSizeY−1)) should be true. That is, sps_ref_wraparound_enabled_flag may be present in the bitstream regardless of picture width. However, if sps_ref_wraparound_enabled_flag is true, then ((CtbSizeY/MinCbSizeY+1)<=(max_width_in_luma_samples/MinCbSizeY−1)) should be true. If ((CtbSizeY/MinCbSizeY+1)<=(max_width_in_luma_samples/MinCbSizeY−1)) is false, then sps_ref_wraparound_enabled_flag is false (e.g., wraparound motion compensation is not enabled). Stated another way, based on the sps_ref_wraparound_enabled_flag indicating that wraparound motion compensation is enabled, (CtbSizeY/MinCbSizeY+1) is less than or equal to (pic_width_in_luma_samples/MinCbSizeY−1), where CtbSizeY is a height of the coding tree block (largest coding block size), MinCbSizeY is indicative of minimum coding block size, and pic_width_in_luma_samples is indicative of the picture width a picture that includes the current block.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to receive from a bitstream information (e.g., pic_width_in_luma_samples in PPS or max_width_in_luma_samples in SPS) used to determine whether a syntax element indicating whether wraparound motion compensation is enabled is present in the parameter set and receive from the bitstream the syntax element indicating whether wraparound motion compensation is enabled in the same parameter set (e.g., pps_ref_wraparound_enabled_flag if pic_width_in_luma_samples in PPS is used or sps_ref_wraparound_enabled_flag if max_width_in_luma_samples is SPS is used). Video decoder 300 may be configured to code (e.g., decode) information used to determine whether a syntax element indicating whether wraparound motion compensation is enabled is present in a parameter set and code (e.g., decode) a syntax element indicating whether wraparound motion compensation is enabled in the same parameter set.

Figure 5:
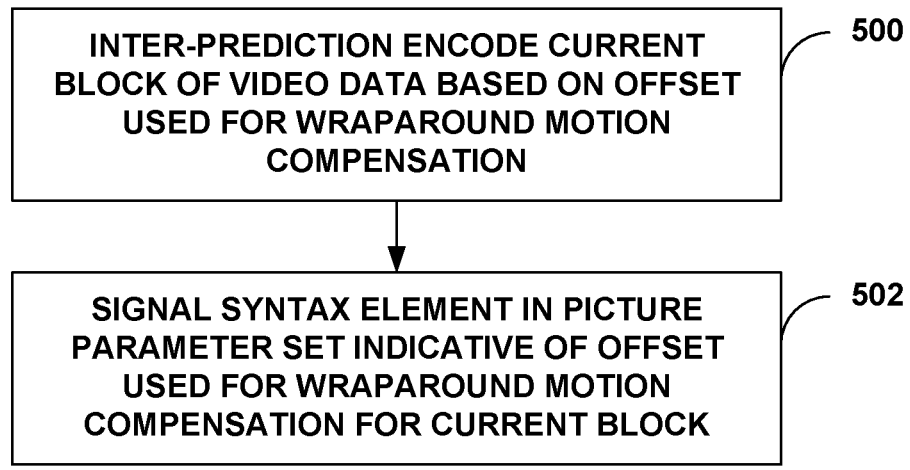
FIG. 5 is a flowchart illustrating an example method for encoding a current block of video data.

FIG. 5 is a flowchart illustrating an example method for encoding a current block. The current block may comprise a current CU. Although described with respect to video encoder 200 (FIGS. 1 and 3), it should be understood that other devices may be configured to perform a method similar to that of FIG. 5.

The example of FIG. 5 is described with respect to processing circuitry, such as processing circuitry of video encoder 200. In the example of FIG. 5, memory may be configured to store syntax elements of a picture parameter set (PPS). Examples of the memory include memory 106, video data memory 230, DPB 218, or any other memory or memories coupled to video encoder 200.

The processing circuitry of video encoder 200 may be configured to inter-prediction encode a current block of video data based on an offset used for wraparound motion compensation (500). For example, WMC unit 225 may be configured to generate a prediction block based on the offset used for wraparound motion compensation, and entropy encoding unit 220 may signal information of a residual block indicative of a difference between the prediction block and the current block. Residual generation unit 204 may generate the residual block indicative of the difference between the prediction block and the current block.

The processing circuitry of video encoder 200 may signal a syntax element in a picture parameter set (PPS) indicative of the offset used for the wraparound motion compensation for the current block (502). One example of the syntax element is pps_ref_wraparound_offset_minus1. However, other examples of the syntax element indicative of the offset used for the wraparound motion compensation are possible.

In one or more examples, the processing circuitry of video encoder 200 may signal a syntax element in the PPS indicative of whether wraparound motion compensation is enabled (e.g., pps_ref_wraparound_enabled_flag). For example, to signal the syntax element in the PPS indicative of the offset used for wraparound motion compensation for the current block, the processing circuitry of video encoder 200 may be configured to signal the first syntax element (e.g., pps_ref_wraparound_offset_minus1) based on the second syntax element in the PPS (e.g., pps_ref_wraparound_enabled_flag) indicating that wraparound motion compensation is enabled.

Moreover, the processing circuitry of video encoder 200 may signal a syntax element in a sequence parameter set (SPS) indicative of whether wraparound motion compensation is enabled regardless of a picture width (e.g., signal sps_ref_wraparound_enabled_flag regardless of the picture width). However, based on sps_ref_wraparound_enabled_flag indicating that wraparound motion compensation is enabled, (CtbSizeY/MinCbSizeY+1) is less than or equal to (pic_width_in_luma_samples/MinCbSizeY−1), where CtbSizeY is a height of the coding tree block (largest coding block size), MinCbSizeY is indicative of minimum coding block size, and pic_width_in_luma_samples is indicative of the picture width of a picture that includes the current block.

Figure 6:
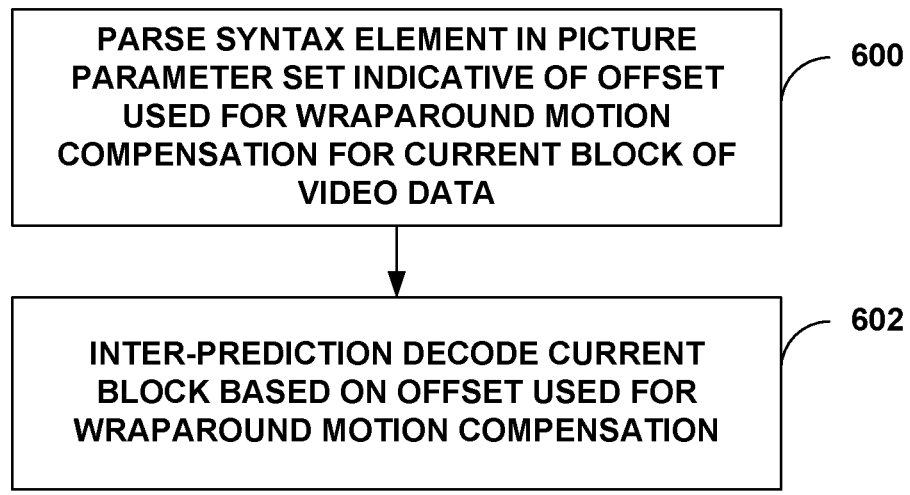
FIG. 6 is a flowchart illustrating an example method for decoding a current block of video data.

FIG. 6 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 6.

The example of FIG. 6 is described with respect to processing circuitry, such as processing circuitry of video decoder 300. In the example of FIG. 6, memory may be configured to store syntax elements of a picture parameter set (PPS). Examples of the memory include memory 120, CPB memory 320, DPB 314, or any other memory or memories coupled to video decoder 300.

The processing circuitry of video decoder 300 may be configured to parse a syntax element in a picture parameter set (PPS) indicative of an offset used for wraparound motion compensation for a current block of video data (600). One example of the syntax element is pps_ref_wraparound_offset_minus1. However, other examples of the syntax element indicative of the offset used for the wraparound motion compensation are possible.

In one or more examples, the processing circuitry of video decoder 300 may parse a syntax element in the PPS indicative of whether wraparound motion compensation is enabled (e.g., pps_ref_wraparound_enabled_flag). For example, to parse the syntax element in the PPS indicative of the offset used for wraparound motion compensation for the current block, the processing circuitry of video decoder 300 may be configured to parse the first syntax element (e.g., pps_ref_wraparound_offset_minus1) based on the second syntax element in the PPS (e.g., pps_ref_wraparound_enabled_flag) indicating that wraparound motion compensation is enabled.

Moreover, the processing circuitry of video decoder 300 may parse a syntax element in a sequence parameter set (SPS) indicative of whether wraparound motion compensation is enabled regardless of a picture width (e.g., parse sps_ref_wraparound_enabled_flag regardless of the picture width). However, based on sps_ref_wraparound_enabled_flag indicating that wraparound motion compensation is enabled, (CtbSizeY/MinCbSizeY+1) is less than or equal to (pic_width_in_luma_samples/MinCbSizeY−1), where CtbSizeY is a height of the coding tree block (largest coding block size), MinCbSizeY is indicative of minimum coding block size, and pic_width_in_luma_samples is indicative of the picture width of a picture that includes the current block.

The processing circuitry of video decoder 300 may be configured to inter-prediction decode the current block of video data based on the offset used for wraparound motion compensation (602). For example, WMC unit 317 may be configured to generate a prediction block based on the offset used for wraparound motion compensation, and reconstruction unit 310 may add the prediction block to a residual block to reconstruct the current block.

The following describes one or more examples that may be performed individually or in combination with the one or more example techniques described in this disclosure.

Example 1. A method of coding video data, the method comprising coding information used to determine whether a syntax element indicating whether wraparound motion compensation is enabled is present in a parameter set and coding a syntax element indicating whether wraparound motion compensation is enabled in the same parameter set.

Example 2. The method of example 1, wherein the parameter set is a sequence parameter set (SPS).

Example 3. The method of example 1, wherein the parameter set is a picture parameter set (PPS).

Example 4. The method of any of examples 1 and 2, wherein the information used to determine whether wraparound motion compensation is applied comprises information indicative of a maximum width in luma samples.

Example 5. The method of any of examples 1 and 3, wherein the information used to determine whether wraparound motion compensation is applied comprises information indicative of a picture width in luma samples.

Example 6. The method of any of examples 1-5, further comprising receiving from a bitstream the information used to determine whether the syntax element indicating whether wraparound motion compensation is enabled is present in the parameter set and receiving from the bitstream the syntax element indicating whether wraparound motion compensation is enabled in the same parameter set, wherein coding the information comprises decoding the information, and wherein coding the syntax element comprises decoding the syntax element.

Example 7. The method of any of examples 1-5, wherein coding the information comprises encoding the information, and coding the syntax element comprises encoding the syntax element, the method further comprising signaling in a bitstream the encoded information used to determine whether the syntax element indicating whether wraparound motion compensation is enabled is present in the parameter set and signaling in the bitstream the encoded syntax element indicating whether wraparound motion compensation is enabled in the same parameter set.

Example 8. A method of coding video data, the method comprising coding a syntax element indicating whether wraparound motion compensation is enabled regardless of a picture width in luma samples.

Example 9. The method of example 8, further comprising receiving from a bitstream the syntax element, wherein coding the syntax element comprises decoding the syntax element.

Example 10. The method of example 8, wherein coding the syntax element comprises encoding the syntax element, the method further comprising signaling the encoded syntax element.

Example 11. A method of coding video data, the method comprising coding information used to derive conformance window using any technique or combination of techniques described in this disclosure.

Example 12. The method of example 11, further comprising receiving from a bitstream the information, wherein coding the information comprises decoding the information.

Example 13. The method of example 11, wherein coding the information comprises encoding the information, the method further comprising signaling the encoded information in a bitstream.

Example 14. A device for coding video data, the device comprising a memory configured to store video data and a video coder comprising at least one of fixed-function or programmable circuitry, wherein the video coder is configured to perform the method of any of examples 1-13.

Example 15. The device of example 14, wherein the video coder comprises a video decoder, wherein the video decoder is configured to perform the method of any of examples 1-6, 8, 9, 11, and 12.

Example 16. The device of example 14, wherein the video coder comprises a video encoder, wherein the video encoder is configured to perform the method of any of examples 1-5, 7, 8, 10, 11, and 13.

Example 17. The device of any of examples 14-16, further comprising one or more of a display configured to display decoded video data, a camera, a computer, a mobile device, a broadcast receiver device, or a set-top box.

Example 18. A computer-readable storage medium having stored thereon instructions that, when executed, cause one or more processors to perform the method of any of examples 1-13.

Example 19. A device for coding video data, the device comprising means for performing the method of any of examples 1-13.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   parsing a first syntax element in a picture parameter set (PPS) indicative of whether wraparound motion compensation is enabled for a current block of the video data, wherein, based on the first syntax element indicating that wraparound motion compensation is enabled, (CtbSizeY/MinCbSizeY+1) is less than or equal to (pic_width_in_luma_samples/MinCbSizeY−1), wherein CtbSizeY is a height of the coding tree block, MinCbSizeY is indicative of minimum coding block size, and pic_width_in_luma_samples is indicative of the picture width of a picture that includes the current block;
   parsing a second syntax element in a sequence parameter set (SPS) indicative of whether wraparound motion compensation is enabled regardless of a picture width; and
   inter-prediction decoding the current block based on the first syntax element and the second syntax element.

2. The method of claim 1, further comprising:
   parsing a third syntax element in the PPS indicative of an offset used for wraparound motion compensation for the current block based on the first syntax element and the second syntax element indicating that wraparound motion compensation is enabled.

3. The method of claim 1, wherein, the value of the second syntax element, indicating that wraparound motion compensation is enabled, is further constrained based on the picture width, minimum block size, and maximum block size.

4. The method of claim 1, wherein, based on the second syntax element indicating that wraparound motion compensation is enabled, (CtbSizeY/MinCbSizeY+1) is less than or equal to (pic_width_in_luma_samples/MinCbSizeY−1).

5. The method of claim 2, wherein inter-prediction decoding comprises:
   generating a prediction block based on the offset used for wraparound motion compensation; and
   adding the prediction block to a residual block to reconstruct the current block.

6. A device for decoding video data, the device comprising:
   memory configured to store syntax elements of a picture parameter set (PPS) and a sequence parameter set (SPS); and
   processing circuitry configured to:
      parse a first syntax element in the PPS indicative of whether wraparound motion compensation is enabled for a current block of the video data, wherein, based on the first syntax element indicating that wraparound motion compensation is enabled, (CtbSizeY/MinCbSizeY+1) is less than or equal to (pic_width_in_luma_samples/MinCbSizeY−1), wherein CtbSizeY is a height of the coding tree block, MinCbSizeY is indicative of minimum coding block size, and pic_width_in_luma_samples is indicative of the picture width of a picture that includes the current block;
      parse a second syntax element in the SPS indicative of whether wraparound motion compensation is enabled regardless of a picture width; and
      inter-prediction decode the current block based on the first syntax element and the second syntax element.

7. The device of claim 6, wherein the processing circuitry is configured to:
   parse a third syntax element in the PPS indicative of an offset used for wraparound motion compensation for the current block based on the first syntax element and the second syntax element indicating that wraparound motion compensation is enabled.

8. The device of claim 6, wherein, the value of the second syntax element, indicating that wraparound motion compensation is enabled, is further constrained based on the picture width, minimum block size, and maximum block size.

9. The device of claim 1, wherein, based on the second syntax element indicating that wraparound motion compensation is enabled, (CtbSizeY/MinCbSizeY+1) is less than or equal to (pic_width_in_luma_samples/MinCbSizeY−1).

10. The device of claim 7, wherein to inter-prediction decode, the processing circuitry is configured to:
    generate a prediction block based on the offset used for wraparound motion compensation; and
    add the prediction block to a residual block to reconstruct the current block.

11. The device of claim 6, further comprising a display configured to display a picture that includes the current block.

12. The device of claim 6, further comprising at least one of a camera, a computer, a wireless communication device, a broadcast receiver device, or a set-top box.

13. A method of encoding video data, the method comprising:
    signaling a first syntax element in a picture parameter set (PPS) indicative of whether wraparound motion compensation is enabled for a current block of the video data, wherein, based on the first syntax element indicating that wraparound motion compensation is enabled, (CtbSizeY/MinCbSizeY+1) is less than or equal to (pic_width_in_luma_samples/MinCbSizeY−1), wherein CtbSizeY is a height of the coding tree block, MinCbSizeY is indicative of minimum coding block size, and pic_width_in__luma_samples is indicative of the picture width of a picture that includes the current block;
    signaling a second syntax element in a sequence parameter set (SPS) indicative of whether wraparound motion compensation is enabled regardless of a picture width;
    inter-prediction encoding the current block of the video data based on an offset used for wraparound motion compensation; and
    signaling a third syntax element in the PPS indicative of the offset used for the wraparound motion compensation for the current block based on the first syntax element and the second syntax element indicating that wraparound motion compensation is enabled.

14. The method of claim 13, wherein, the value of the second syntax element, indicating that wraparound motion compensation is enabled, is further constrained based on the picture width, minimum block size, and maximum block size.

15. The method of claim 13, wherein, based on the second syntax element indicating that wraparound motion compensation is enabled, (CtbSizeY/MinCbSizeY+1) is less than or equal to (pic_width_in_luma_samples/MinCbSizeY−1).

16. The method of claim 13, wherein inter-prediction encoding comprises:
    generating a prediction block based on the offset used for wraparound motion compensation; and signaling information of a residual block indicative of a difference between the prediction block and the current block.

17. A device for encoding video data, the device comprising:
  memory configured to store syntax elements of a picture parameter set (PPS) and a sequence parameter set (SPS); and
  processing circuitry configured to:
    signal a first syntax element in the PPS indicative of whether wraparound motion compensation is enabled for a current block of the video data, wherein, based on the first syntax element indicating that wraparound motion compensation is enabled, (CtbSizeY/MinCbSizeY+1) is less than or equal to (pic_width_in_luma_samples/MinCbSizeY−1),
    wherein CtbSizeY is a height of the coding tree block, MinCbSizeY is indicative of minimum coding block size, and pic_width_in_luma_samples is indicative of the picture width of a picture that includes the current block;
    signal a second syntax element in the SPS indicative of whether wraparound motion compensation is enabled regardless of a picture width;
    inter-prediction encode the current block of the video data based on an offset used for wraparound motion compensation; and
    signal a third syntax element in the PPS indicative of the offset used for the wraparound motion compensation for the current block based on the first syntax element and the second syntax element indicating that wraparound motion compensation is enabled.

18. The device of claim 17, wherein, the value of the second syntax element, indicating that wraparound motion compensation is enabled, is further constrained based on the picture width, minimum block size, and maximum block size.

19. The device of claim 17, wherein, based on the second syntax element indicating that wraparound motion compensation is enabled, (CtbSizeY/MinCbSizeY+1) is less than or equal to (pic_width_in_luma_samples/MinCbSizeY−1).

20. The device of claim 17, wherein to inter-prediction encode, the processing circuitry is configured to:
  generate a prediction block based on the offset used for wraparound motion compensation; and
  signal information of a residual block indicative of a difference between the prediction block and the current block.

21. The device of claim 17, further comprising a camera configured to capture a picture that includes the current block.

22. The device of claim 17, further comprising at least one of a camera, a computer, a wireless communication device, a broadcast receiver device, or a set-top box.

23. A device for decoding video data, the device comprising:
  means for parsing a first syntax element in a picture parameter set (PPS) indicative of whether wraparound motion compensation is enabled for a current block of the video data, wherein, based on the first syntax element indicating that wraparound motion compensation is enabled, (CtbSizeY/MinCbSizeY+1) is less than or equal to (pic_width_in_luma_samples/MinCbSizeY−1), wherein CtbSizeY is a height of the coding tree block, MinCbSizeY is indicative of minimum coding block size, and pic_width_in_luma_samples is indicative of the picture width of a picture that includes the current block;
  means for parsing a second syntax element in a sequence parameter set (SPS) indicative of whether wraparound motion compensation is enabled regardless of a picture width; and
  means for inter-prediction decoding the current block based on the first syntax element and the second syntax element.

24. A computer-readable storage medium having stored thereon instructions that, when executed, cause one or more processors to:
  parse a first syntax element in a picture parameter set (PPS) indicative of whether wraparound motion compensation is enabled for a current block of the video data, wherein, based on the first syntax element indicating that wraparound motion compensation is enabled, (CtbSizeY/MinCbSizeY+1) is less than or equal to (pic_width_in_luma_samples/MinCbSizeY−1), wherein CtbSizeY is a height of the coding tree block, MinCbSizeY is indicative of minimum coding block size, and pic_width_in_luma_samples is indicative of the picture width of a picture that includes the current block;
  parse a second syntax element in a sequence parameter set (SPS) indicative of whether wraparound motion compensation is enabled regardless of a picture width; and
  inter-prediction decode the current block based on the first syntax element and the second syntax element.

* * * * *